Figures 4, 5, 6:
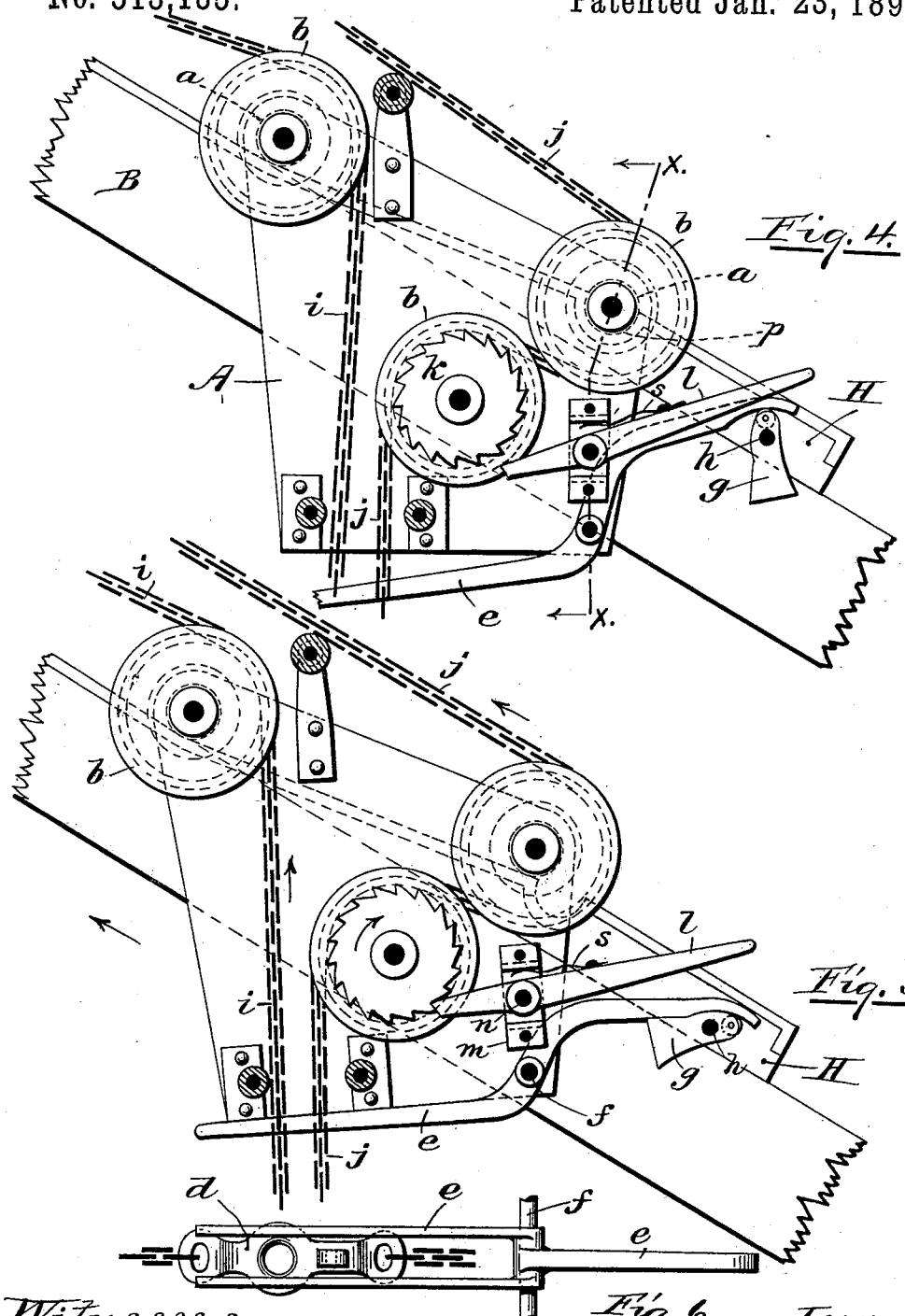

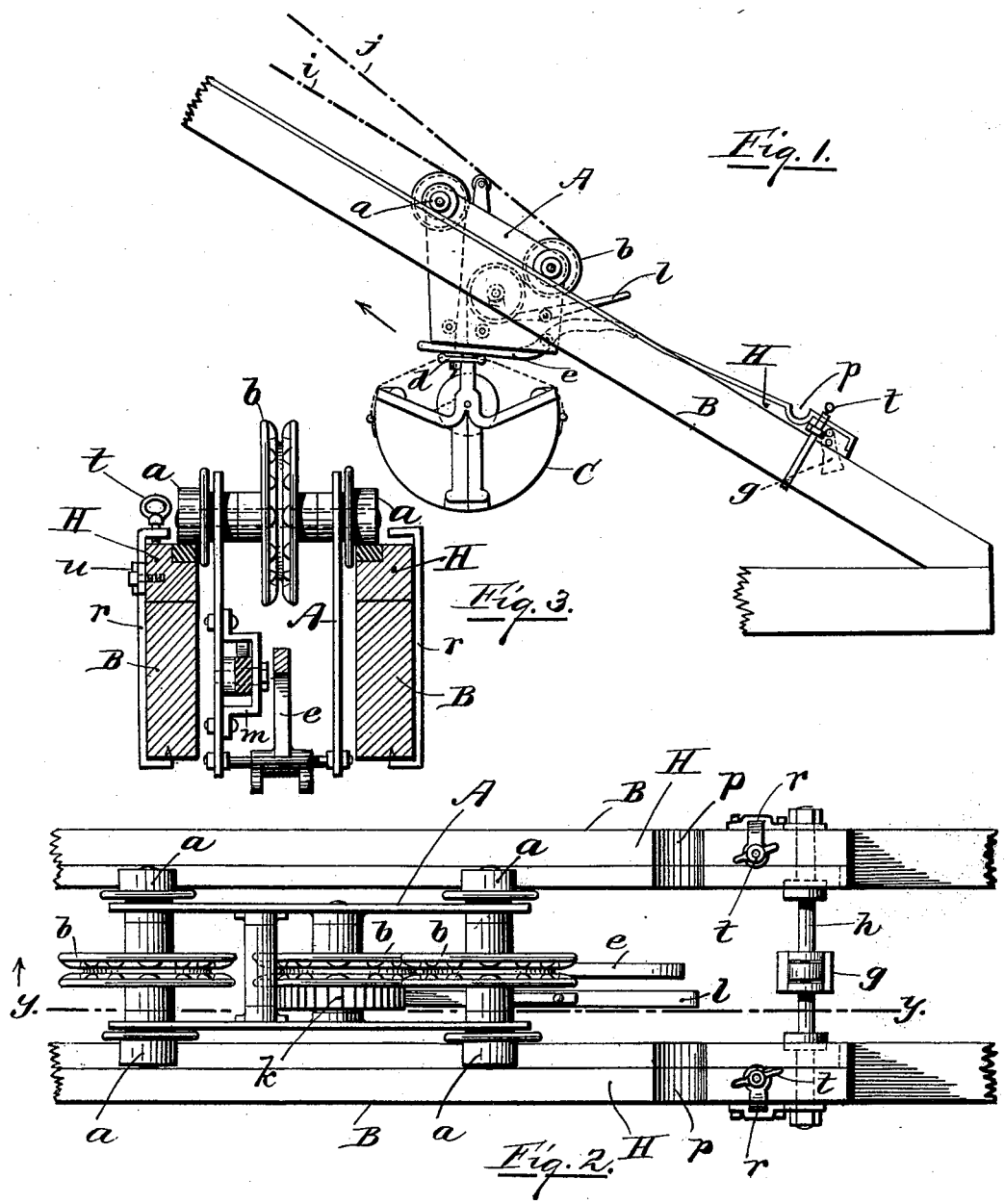

(No Model.) 2 Sheets—Sheet 2.

C. PAY.
HOISTING APPARATUS.

No. 513,135. Patented Jan. 23, 1894.

Witnesses
Charles Hannigan
A. E. MacLaine

Inventor
Charles Pay
by Walter B. Vincent
Atty.

THE NATIONAL LITHOGRAPHING COMPANY,
WASHINGTON, D. C.

UNITED STATES PATENT OFFICE.

CHARLES PAY, OF PROVIDENCE, RHODE ISLAND.

HOISTING APPARATUS.

SPECIFICATION forming part of Letters Patent No. 513,135, dated January 23, 1894.

Application filed August 7, 1893. Serial No. 482,519. (No model.)

*To all whom it may concern:*

Be it known that I, CHARLES PAY, of Providence, in the State of Rhode Island, have made certain new and useful Improvements in Hoisting Apparatus; and I do hereby declare that the following specification, taken in connection with the drawings making a part of the same, is a full, clear, and exact description thereof.

Figure 1. is a side elevation of carriage and hoisting bucket and railway. Fig. 2. is an enlarged plan of same. Fig. 3. is a cross section on line $x.\ x.$ Fig. 4. Fig. 4. is a longitudinal section on line $y.\ y.$ Fig. 2 showing portion of mechanism during vertical rise of bucket. Fig. 5. is a similar view with carriage at the commencement of its movement upward upon the railway. Fig. 6. is a plan view of the forked lever.

My invention relates to hoisting buckets which have first a strictly vertical movement, and subsequently a movement both vertical and horizontal upon an inclined railway, and consists in the devices for the easy, rapid and accurate handling of the bucket and contents as hereinafter described.

In the drawings "A" is the bucket carriage, which is placed between two inclined booms or tracks "B" and has two sets of wheels $a.$ rotating upon said track and a train of three chain wheels $b.$ between the sides of the carriage as shown in Figs. 2 and 3.

C is the bucket having an eye-bar $d.$ which engages with a forked lever $l.$ as shown in Fig. 6. The lever $e.$ is pivoted to a shaft $f.$ of the carriage and is brought to bear upon a gravity cam $g.$ which moves in a half circle only.

P. P. are pockets in the booms or tracks B. for the reception and retention, at intervals, of one set of the wheels $a.$ which rotate upon said track.

K. is a ratchet wheel which is fixed to the lower chain wheel $b.$ which is engaged by a lever $l.$ pivoted at $n.$ the latter being under the control of a spring S.

$h.$ is a fixed stationary shaft to which the gravity cam $g.$ is pivoted, the ends of which shaft are fastened to adjustable slides H. upon the tracks or booms B.

Upon each side of the tracks are clamping bolts $r.\ r.$ Figs. 1. 2. and 3. held in place by a plate U. bolted to the outside of the slides H., the latter being clamped to the track by screw $t.$ $i.$ is the hoisting chain, and $j.$ the opening chain.

The operation of my device, starting with the parts in the position shown on Fig. 4., that is to say, with the carriage at its lowest point upon the tracks, the lower wheels of the carriage A. in the pockets P. P. and the bucket in the hold of the vessel with its load, is as follows: The bucket is drawn up by the hoisting chain $i.$ which passes over the upper wheel of the train $b.$ the opening chain $j.$ at the same time passing over the remaining wheels of said train as shown until the bucket reaches the carriage, when it comes in contact with sufficient force to counteract the gravity of the cam $g.$, with the lever $e.$ and raises the end of the lever $e.$ as shown in Fig. 5. The consequent depression of the opposite end of the lever $e.$ releases the lever $l.$ which through the action of the spring S. becomes engaged with the fixed ratchet K. and prevents the rotation of the opening chain wheel and to which the ratchet is fixed, and prevents the opening of the bucket while the wheels are raised from their places. The continued strain upon the chains lifts the two wheels of the set $a.$ from their pockets P. P. and causes the carriage to move upward over the inclined railway until the proper opening position is reached. With the descent of the carriage after the load in the bucket has been disposed of, as the wheels of the carriage again drop into their pockets P. P. the end of the lever $e.$ falls upon the gravity cam $g.$ which raises it sufficiently to lift the lever $l.$ and release the opening chain and permits the bucket to descend to the hold.

The slides H. with their gravity cam $g.$ which may be fixed at any desired point upon the tracks, by the devices already mentioned, and the whole hoisting and carrying apparatus may be adjusted with reference to the position of the vessel as may be desired.

What I claim as my invention, and desire to secure by Letters Patent, is—

1. In a hoisting apparatus, the combination, with the tracks or booms provided with a stop, of a bucket carriage upon the tracks, chain wheels and a ratchet wheel, and two levers pivotally secured to the carriage, one of which levers engages with the ratchet wheel and the other of which is operated by the bucket to release the carriage, substantially as set forth.

2. In a hoisting apparatus, the combination, with the tracks or booms, provided with stops, of a bucket carriage upon the tracks, three chain wheels upon the carriage, a hoisting chain over one of the wheels and an opening chain upon the other two wheels, and means for locking and releasing the carriage upon the tracks, substantially as set forth.

3. In a hoisting apparatus, the combination, with tracks or booms, provided with slides or stops, of a shaft between the slides, a gravity cam upon the shaft, a carriage upon the tracks, chain wheels upon the carriage, a lever pivotally secured to the carriage, one end of which is in engagement with the cam and the opposite end adapted to be operated by the bucket, and means for locking one of the wheels, substantially as set forth.

4. In a hoisting apparatus, the combination, with the tracks or booms, of a slide or stop on each track, a clamping bolt upon each slide, and a set screw in each bolt, substantially as set forth.

CHARLES PAY.

Witnesses:
WALTER B. VINCENT,
AMASA M. EATON.